(12) United States Patent
Ishii

(10) Patent No.: US 6,715,882 B2
(45) Date of Patent: Apr. 6, 2004

(54) PROJECTION TYPE DISPLAY DEVICE

(75) Inventor: Koichiro Ishii, Zushi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/086,856

(22) Filed: Mar. 4, 2002

(65) Prior Publication Data

US 2002/0167646 A1 Nov. 14, 2002

(30) Foreign Application Priority Data

Mar. 6, 2001 (JP) ........................................ 2001-062115

(51) Int. Cl.[7] ........................ G03B 21/00; G03B 21/28; G02F 1/1335; H04N 9/31
(52) U.S. Cl. .................... 353/31; 353/20; 353/33; 353/81; 353/122; 349/5; 349/7; 349/9; 348/744
(58) Field of Search ........................ 353/20, 31, 33, 353/34, 37, 81, 82, 122; 349/5, 7, 8, 9; 348/744

(56) References Cited

U.S. PATENT DOCUMENTS

| | | | | |
|---|---|---|---|---|
| 6,082,861 A | * | 7/2000 | Dove et al. | 353/20 |
| 6,457,829 B1 | * | 10/2002 | Nakazawa et al. | 353/31 |
| 6,536,904 B2 | * | 3/2003 | Kunzman | 353/31 |
| 2001/0021004 A1 | * | 9/2001 | Yano | 353/31 |
| 2002/0122160 A1 | * | 9/2002 | Kunzman | 353/31 |
| 2002/0163529 A1 | * | 11/2002 | Evanicky | 345/600 |

FOREIGN PATENT DOCUMENTS

JP   11-2505758 B2   4/1996   ............ H04N/9/31

OTHER PUBLICATIONS

C.I.E. 1976 U.C.S. Chromaticity Diagram, Ledtronics, Inc. www.ledtronics.com, page 1 of 1, copyright 1997–2003.*

* cited by examiner

Primary Examiner—Russell Adams
Assistant Examiner—Melissa Koval
(74) Attorney, Agent, or Firm—Morgan, Lewis & Bockius LLP

(57) ABSTRACT

A projection type display device comprises a polarization splitting/color separating optical system for polarization-splitting and color-separating beam from an illumination optical system, reflection type light valves, each taking a rectangular shape, for modulating the beam from the polarization splitting color separating optical system in accordance with an image signal and letting the modulated beams exit, a color synthesizing optical system for color-synthesizing the beams from the reflection type light valves, a light analyzing optical system for analyzing the beam from the color synthesizing optical system, and a projection optical system for projecting on a predetermined surface an image based on the image signal generated in the reflection type light valves.

9 Claims, 13 Drawing Sheets

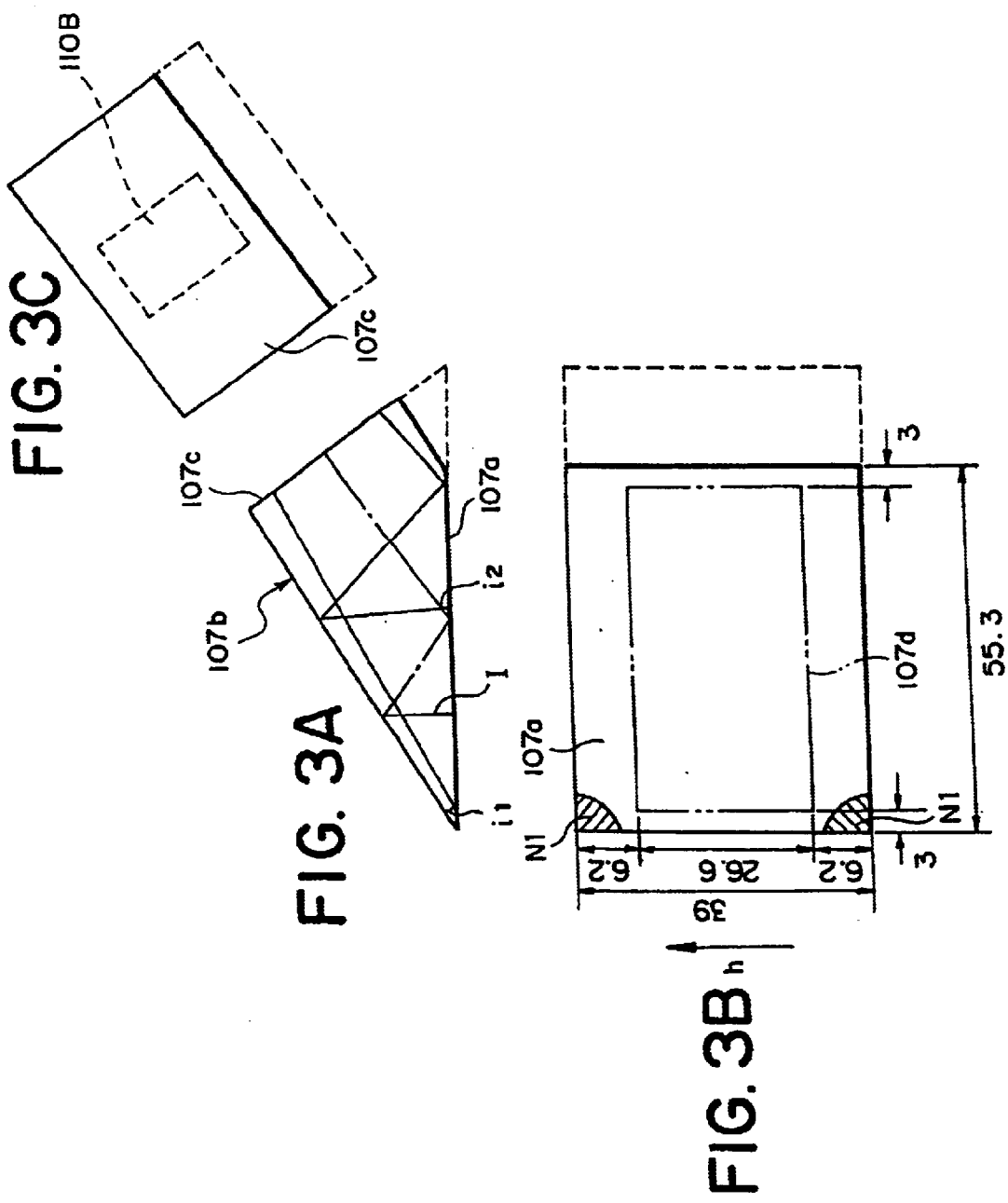

|  | X | Y |
|---|---|---|
| No.1 | -Lx/3 | Ly/3 |
| No.2 | -Lx/3 | 0 |
| No.3 | -Lx/3 | -Ly/3 |
| No.4 | 0 | Ly/3 |
| No.5 | 0 | 0 |
| No.6 | 0 | -Ly/3 |
| No.7 | Lx/3 | Ly/3 |
| No.8 | Lx/3 | 0 |
| No.9 | Lx/3 | -Ly/3 |
| No.10 | -9Lx/20 | 9Ly/20 |
| No.11 | -9Lx/20 | -9Ly/20 |
| No.12 | 9Lx/20 | 9Ly/20 |
| No.13 | 9Lx/20 | -9Ly/20 |

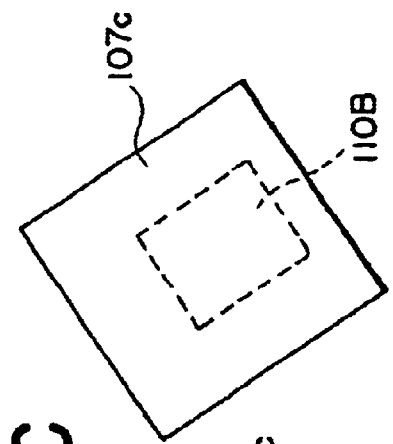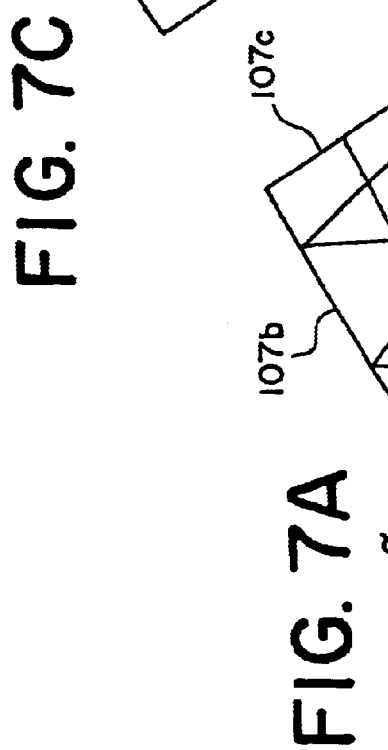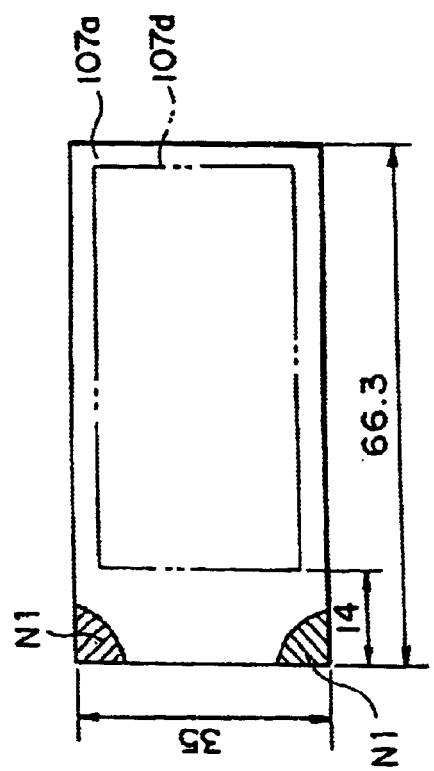
FIG. 7C
FIG. 7A
FIG. 7B

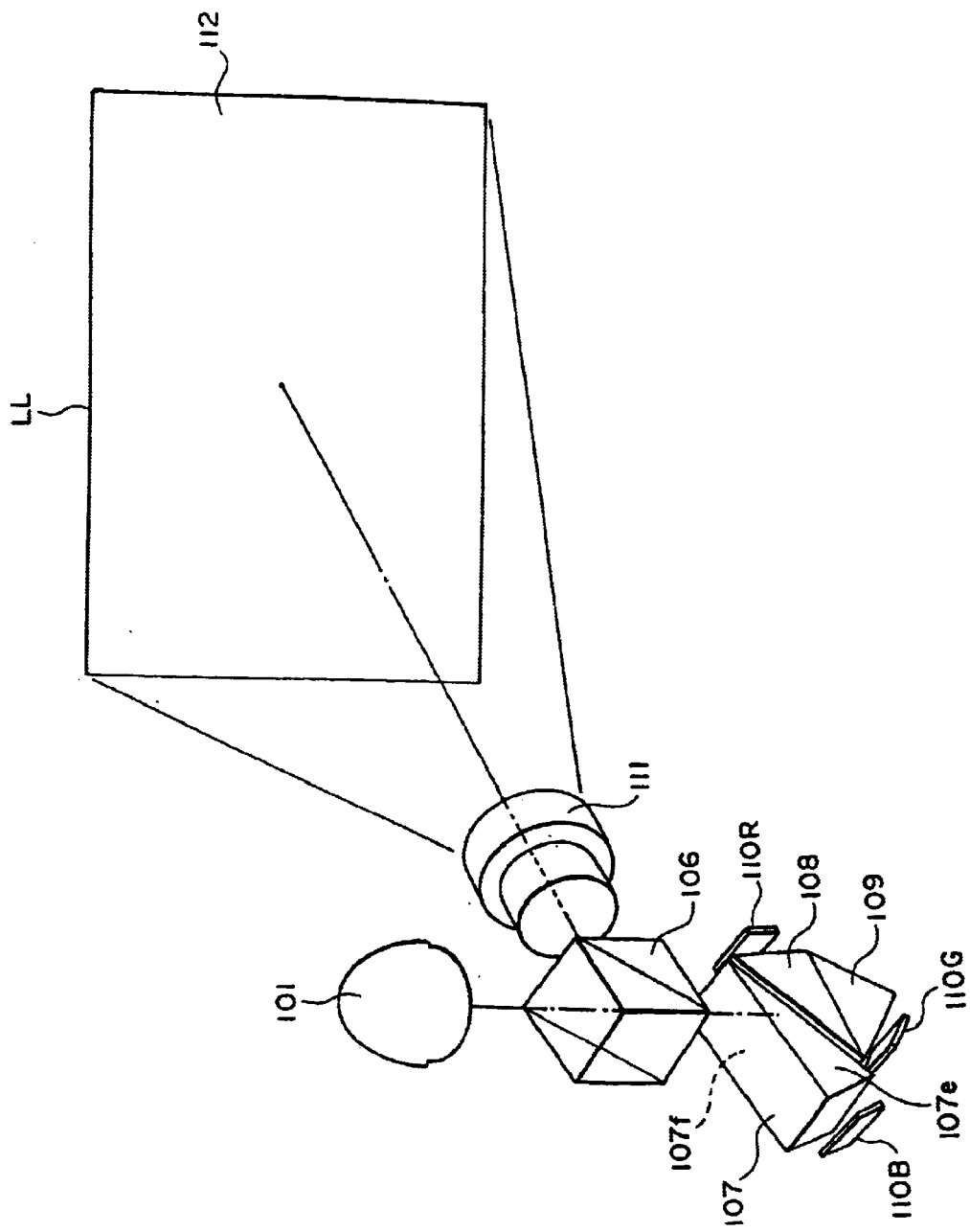

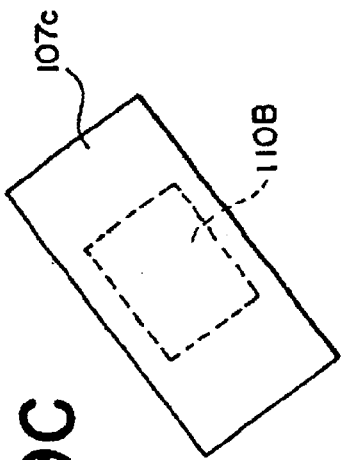
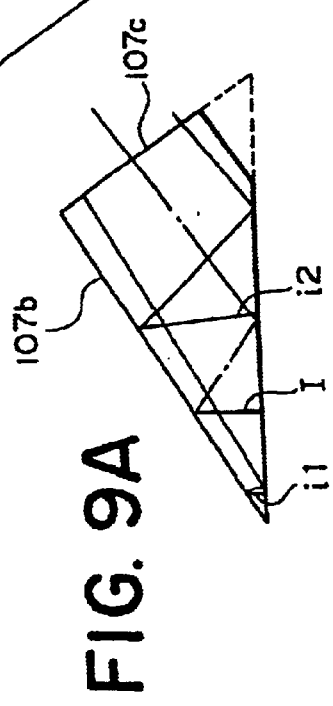
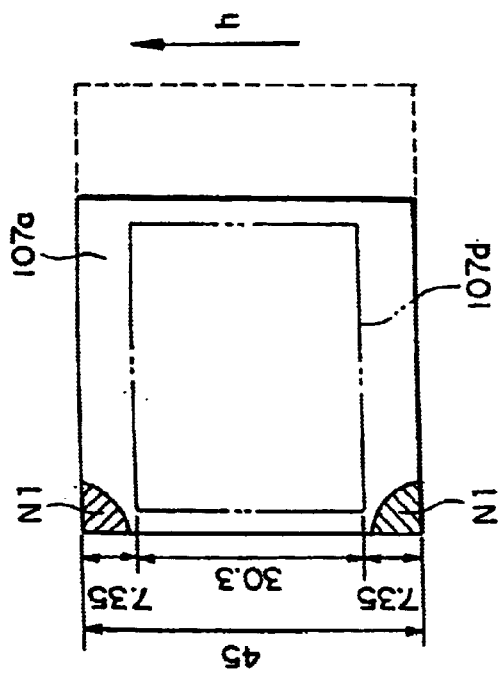

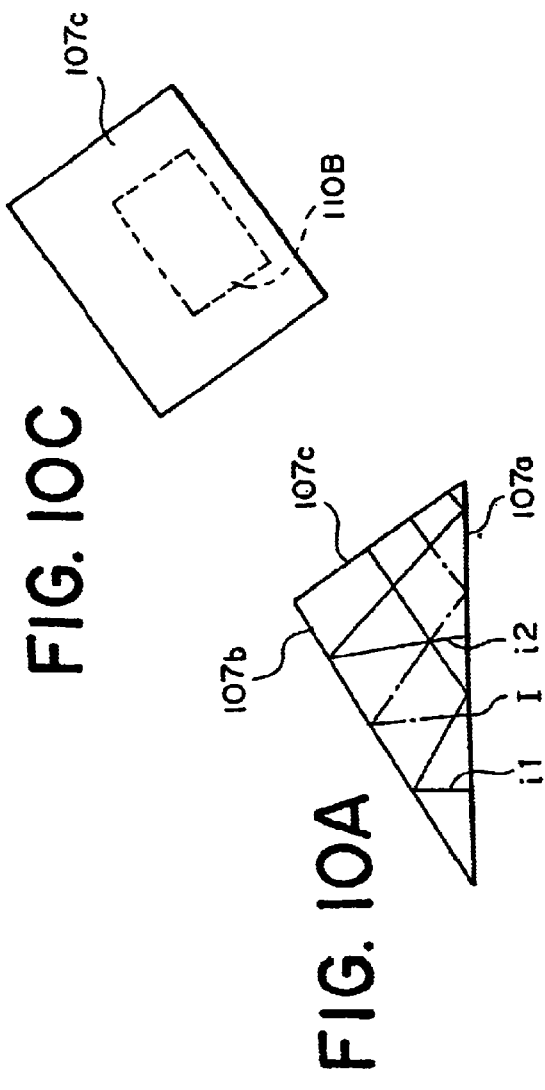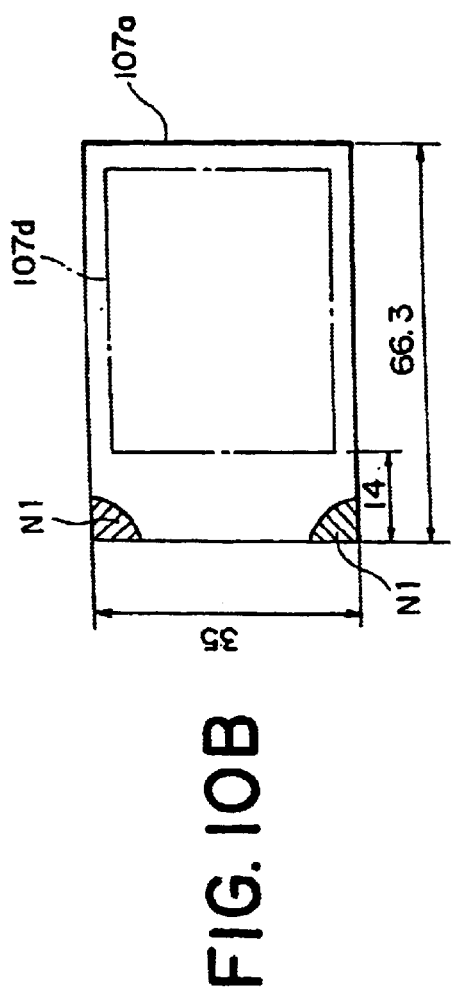

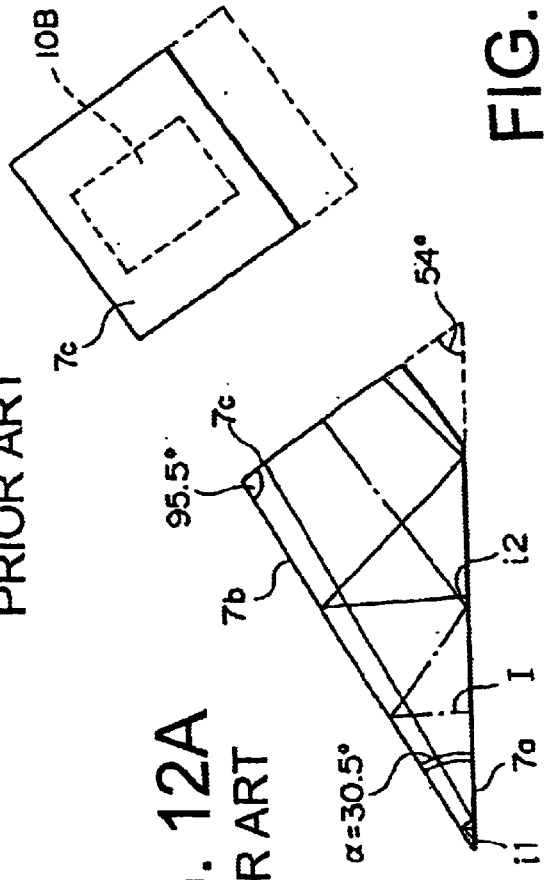
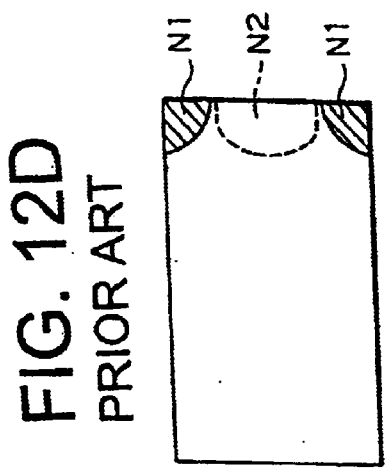
FIG. 12A PRIOR ART
FIG. 12B PRIOR ART
FIG. 12C PRIOR ART
FIG. 12D PRIOR ART

PROJECTION TYPE DISPLAY DEVICE

This application claims the benefit of Japanese Patent application No. 2001-062115 which is hereby incorporated by reference.

BACKGROUND OF THE INVENTION

1. Field of the Invention

The present invention relates to a projection type display device constructed in a way that modulates and reflects color beams entering reflection type light valves disposed for a R (Red)-beam, a G (Green)-beam and a B (Blue)-beam and lets these beams exit, synthesizes and analyzes these color beams, and projects the color beam through a projection lens.

2. Related Background Art

An example of a construction of a prior art projection type display device will be explained. To begin with, a substantially parallel beam from a light source is polarization-split by a polarization beam splitter. Next, the thus polarization-split beam is color-separated into the R (Red)-beam, the G (Green)-beam and the B (Blue)-beam by a color separating optical system. The color-separated color beams such as the R-beam, G-beam and B-beam enter the light valves for the R-, G- and B-beams. The respective color light valves modulate the incidence beams in accordance with image signals and let the modulated beams exit. The reflected beams modulated by the light valves are color-synthesized by a color synthesizing optical system. Then, the color-synthesized beam reenter the polarization beam splitter and is analyzed. Finally, the analyzed beam exiting the polarization beam splitter is projected as a full-color image of the modulated image on a screen through a projection lens.

FIG. 11 is a view schematically showing a configuration of the projection type display device in the prior art and light paths therein. A light source 1 constructed of a lamp and a concave surface mirror such as a parabolic mirror, emits substantially parallel light source beam. The light source beam from the light source 1 enters a fly's eye integrator FE. The fly's eye integrator FE is constructed of a first lens plate 2 having a plurality of first lens elements 2a, 2b, 2c, and a second lens plate 3 having a plurality of second lens elements 3a, 3b, 3c corresponding to the first lens elements 2a, 2b, 2c. Herein, the second element elements 3a, 3b, 3c are provided in focal positions of the first lens elements 2a, 2b, 2c. With this construction, the beam from the light source 1 is, after being split, overlapped on the light receiving surfaces of light valves defined as the radiation receiving surfaces. A uniformity of illuminance of the illumination radiation can be thereby enhanced.

The beams exiting the fly's eye integrator FE enter the polarization beam splitter 6 via a condenser lens 4 and a field lens 5. A polarized light splitting element 6P of the polarization beam splitter 6 reflects an S-polarized beam and transmits a P-polarized beam, thus polarization-splitting the beams. The S-polarized beam reflected by the polarized light splitting element 6P is discarded as an unnecessary beam.

The P-polarized beam exiting the polarization beam splitter 6 enters a color separating/synthesizing composite prism constructed of prisms 7, 8 and 9. The color separating/synthesizing composite prism color-separates the light source beam into the B-, R and G-beams. The structure for the color separation is the same as what is disclosed in, e.g., Patent Publication No. 2505758, and therefore its repetitive explanation is herein omitted.

The color-separated beams assuming the respective colors are incident on light valves 10B, 10R, 10G for the respective colors. The color light valves 10B, 10R, 10G modulate the incidence beams in accordance with image data and then let the modulated beams exit. The beams exiting the color light valves 10B, 10R, 10G enter the color separating/synthesizing composite prism and are color-synthesized. The thus color-synthesized beam enters the polarization beam splitter 6. The polarized-light splitting element 6P of the polarization beam splitter 6 reflects and analyzes the modulated beam (S-polarized beam) in the color-synthesized beam. The modulated beam reflected by the polarized-light splitting element 6P exits the polarization beam splitter 6. The modulated beam exiting the polarization beam splitter 6 enters a projection lens 11. The projection lens 11 projects images generated on the color light valves 10B, 10R, 10G as a full-color image on a screen 12.

In the projection type display device according to the prior art, light is absorbed by glass materials constituting the polarization beam splitter 6, and the prisms 7, 8, 9 of the color separating/synthesizing composite prism, a bonding agent for bonding the prisms to each other and an optical thin film for color-separating the incidence beams. With this light absorption, the polarization beam splitter 6, the prisms 7, 8, 9 get exothermic. With this heat emission, volumes of the optical elements expand. Herein, the optical elements such as the polarization beam splitter 6 and the prisms 7, 8, 9 are mechanically fixed to a frame or the like. Accordingly, stresses derived from the heat emission occur in interiors of the optical elements. Then, a polarized-light splitting characteristic declines due to these stresses. This results in such a problem that a contrast of the projected image decreases.

A relationship between the stresses derived from the heat emission and configurations of the light paths or the optical elements, will be explained in greater detail.

Referring to FIG. 11, the beams converged on the lens elements 3a, 3c of the second lens plate 3 that correspond to the outermost lens elements 2a, 2c of the first lens plate 2 receiving the incidence of the light source beams, form luminous points. Outermost marginal rays i1, i2 of the beams emerging from these luminous points travel through the condenser lens 4 and the field lens 5. Then, the two rays i1, i2 become the outermost marginal rays of the beam entering the polarization beam splitter 6.

Further, the light source beam traveling via the lens element 2b of the first lens plate 2 on an optical axis I is converged as a luminous point on the corresponding lens element 3b of the second lens plate 3. The beam from this luminous point on the second lens plate 3 becomes chief rays i0. The field lens 5 collimates the chief rays i0 into substantially parallel light rays. Then, the chief rays collimated into substantially the parallel light rays travel through the prisms 7, 8, 9 of the color separating/synthesizing composite prism and the color light valves 10B, 10R, 10G and are converged at an aperture stop (unillustrated) of the projection lens 11.

A size of each of incidence surfaces of the light valves 10B, 10R, 10G is 0.907 in., and a surface dimension of the incidence surface is given by 18.43 mm (width)×13.82 mm (length). In FIG. 11 showing the schematic geometry, a long side of the incidence surface of each of the light valves 10B, 10R, 10G is parallel with the sheet surface, while the short side is vertical to the sheet surface. This geometry will hereinafter be called a "lateral layout".

FIG. 12A is a view showing a configuration in section perpendicular to the light source beam incidence surface 7a of the prism 7. The outermost marginal ray i1 enters, from the side of the surface 7a, the vicinity of an acute-angled α portion formed of the incidence surfaces 7a, 7b of the prism 7 taking substantially a shape of a triangular prism.

FIG. 12B is a view viewed from the side of the surface 7a of the prism 7. FIG. 12C is a view viewed from the side of the surface 7c of the prism 7. The B-beam in the beam entering the surface 7a is reflected by the surface 7b coated with the dichroic film reflecting the B-beam. Next, the B-beam is totally reflected by the surface 7a and thereafter exits the surface 7c. Therefore, as shown in FIG. 12B, an effective area 7d irradiated with the beam in the area of the surface 7a does not take a shape proportional to the configuration of the radiation element of the light valve and takes a shape enlarged in the longitudinal direction. Note that an apex portion, having an angle of 54 degrees, of the prism 7 does not, as shown in FIG. 12A, substantially transmit the beam. Hence, this portion assumes a shape cut, wherein a width of 3 mm from the effective portion of the illumination radiation is left.

FIG. 12D is a view showing a contrast decline portion N1 appeared on the projected image. The decline of contrast, when the projected image is displayed in black, becomes more conspicuous because of the contrast decline portion N1 becoming whitish.

The inventor of the present application analyzed internal stresses due to thermal expansions caused by the incidence of the beam with respect to the prism 7 in the projection type display device according to the prior art. An analysis model is calculated by use of a finite element method on the assumption that the beam with a uniform distribution totally enters the incidence surface 7a of the prism 7 in FIG. 12A. FIG. 13 qualitatively depicts directions and moments of the internal stresses occurred in the prism 7 by use of double-arrow lines. As obvious from FIG. 13, it proved that the stresses concentrate on the acute-angled α portion of the prism 7. Further, an absolute value of the stress is large in the vicinity M of the center of the acute-angled α portion in a direction of a height h. The stress in the vicinity M of the center occurs in the direction parallel to the height h of the prism 7.

Moreover, the inventor of the present application found out that the internal stresses occur in the upper and lower surfaces 7e, 7f of the prism so as to continuously link in the directions parallel with the upper and lower surfaces 7e, 7f.

Note that the thermal stresses, as in the prism 7, occur in the optical elements such as the polarization beam splitter 6 and the prisms 8, 9. In the polarization beam splitter 6 etc, however, the number of passages of the beams through the same portion within each optical element is counted "2" in reciprocation, which is less than in the case of the prism 7. A light quantity of the beam traveling through the prisms 8, 9 decreases corresponding to a quantity of the beam reflected by the prism surface 7b. Therefore, both an exothermic quantity based on the light absorption and the thermal stress occurred are smaller than in the prism 7. Accordingly, it is apparent that the contrast of the projected image declines due to mainly the stresses occurred in the prism 7 exhibiting the maximum passage count of the beams.

The prism 7 has a function of synthesizing and analyzing the plurality of colors but has a large ununiformity in the projected image if the problem of the thermal stress rises, and exhibits a conspicuous decline of contrast.

SUMMARY OF THE INVENTION

It is a primary object of the present invention, which was devised in view of the problems described above, to provide a projection type display device capable of obtaining a projected image exhibiting no ununiformity and a preferable contrast with a simple construction.

To accomplish the above object, according to one aspect of the present invention, a projection type display device comprises an illumination optical system for supplying an illumination radiation, a polarization splitting/color separating optical system for polarization-splitting and color-separating beam from the illumination optical system, reflection type light valves, each taking a rectangular shape, for modulating the beam from the polarization splitting/color separating optical system in accordance with an image signal and letting the modulated beam exit, a color synthesizing optical system for color-synthesizing the beams from the reflection type light valves, a light analyzing optical system for analyzing the beam from the color synthesizing optical system, and a projection optical system for projecting on a predetermined surface an image based on the image signal generated in the reflection type light valves, wherein when the image signal indicates black, the color synthesizing optical system and the light valve are positioned so that a color of a predetermined point in the vicinity of an apex but inside of the apex of a rectangular display area on the predetermined surface, becomes a color of such a coordinate value that a distance of a color in the position corresponding to the center of the light valve is equal to or less than 0.09 from the coordinate value in a u'v' space. Herein, the u'v' space is defined as a coordinate space in a u'v' chromaticity diagram. The u'v' chromaticity diagram is the same as CIE1976UCS chromaticity diagram as well as being a coordinate system close to a human sensation to a color difference and created so that a color difference sensed by human eyes is substantially proportional to a difference between coordinate values on the chromaticity diagram. The projected image is recognized essentially by the human eyes, and hence this coordinate system is herein used as a basis for representing the colors. Further, a distance of a certain point (ux, vx) from central coordinates (uc, vc) is expressed by the following formula (1):

$$\text{Distance} = \{(ux-uc)^2 + (vx-vc)^2\}^{1/2} \tag{1}$$

In the projection type display device of the present invention, when the image signal indicates black, a color separating/synthesizing optical system and the light valves are positioned so that the color of the predetermined point in the vicinity of an apex but inside of the apex of a rectangular display area on the predetermined surface, becomes a color of such a coordinate value that a distance of a color in the position corresponding to the center of the light valve is equal to or less than 0.04 from the coordinate value in the u'v' space.

In the projection type display device according to the present invention, it is preferable that the reflection type light valve includes a reflection type light valve for a blue beam and a reflection type light valve for a long wavelength region, upon which the beam in the longer wavelength region than the blue beam is incident, the color synthesizing system includes a first prism and a second prism, the first prism receives an incidence of the beam from the light valve for the long wavelength region and lets the beam exit, and the second prism receives an incidence of the beam from the light valve for the blue beam, then receives an incidence of the beam exiting the first prism, synthesizes the blue beam entering the second prism with the beam in the long wavelength region and lets the synthesized beam exit toward the light analyzing optical system.

In the projection type display device according to the present invention, it is preferable that the color synthesizing optical system includes a prism, the prism has a first surface totally reflecting the beam from the reflection type light valve, and a second surface receiving an incidence of the beam after the beam from the light valve has been reflected by a dichroic film, and the first surface is flush with the second surface.

In the projection type display device according to the present invention, it is preferable that the prism of the synthesizing optical system has an apex angle of 45 degrees or smaller.

In the projection type display device according to the present invention, when the image signal indicates black, the color synthesizing optical system and light valves are positioned so that a color of any one of points in the rectangular display area on the predetermined surface, becomes a color of such a coordinate value that a distance of a color in a position corresponding to the center of the light valve is equal to or less than 0.09 from a coordinate value in the u'v' space.

In the projection type display device according to the present invention, when the image signal indicates black, the color synthesizing optical system and light valves are positioned so that a color of any one of points in a rectangular display area on the predetermined surface, becomes a color of such a coordinate value that a distance of a color in the position corresponding to the center of each light valve is equal to or less than 0.04 from the coordinate value in the u'v' space.

In the projection type display device according to the present invention, the predetermined point is a point at which to divide, at a ratio of 9 to 1, a distance between the position corresponding to the center of each light valve in the rectangular display area on the predetermined surface and the apex of the rectangular display area.

BRIEF DESCRIPTION OF THE DRAWINGS

FIGS. 3A through 3C are views each showing a configuration of a prism in the modified example of the first embodiment;

FIGS. 7A through 7C are views each showing a configuration of the prism in a second embodiment;

FIG. 8 is a view schematically showing a configuration in a third embodiment;

FIGS. 9A through 9C are views each showing a prism in the third embodiment;

FIGS. 10A through 10C are views each showing a prism in a fourth embodiment;

FIGS. 12A through 12D are views each showing a configuration of a prism in the prior art.

DETAILED DESCRIPTION OF THE PREFERRED EMBODIMENTS

Embodiments of the present invention will hereinafter be described with reference to the accompanying drawings.

(First Embodiment)

Figure 1:
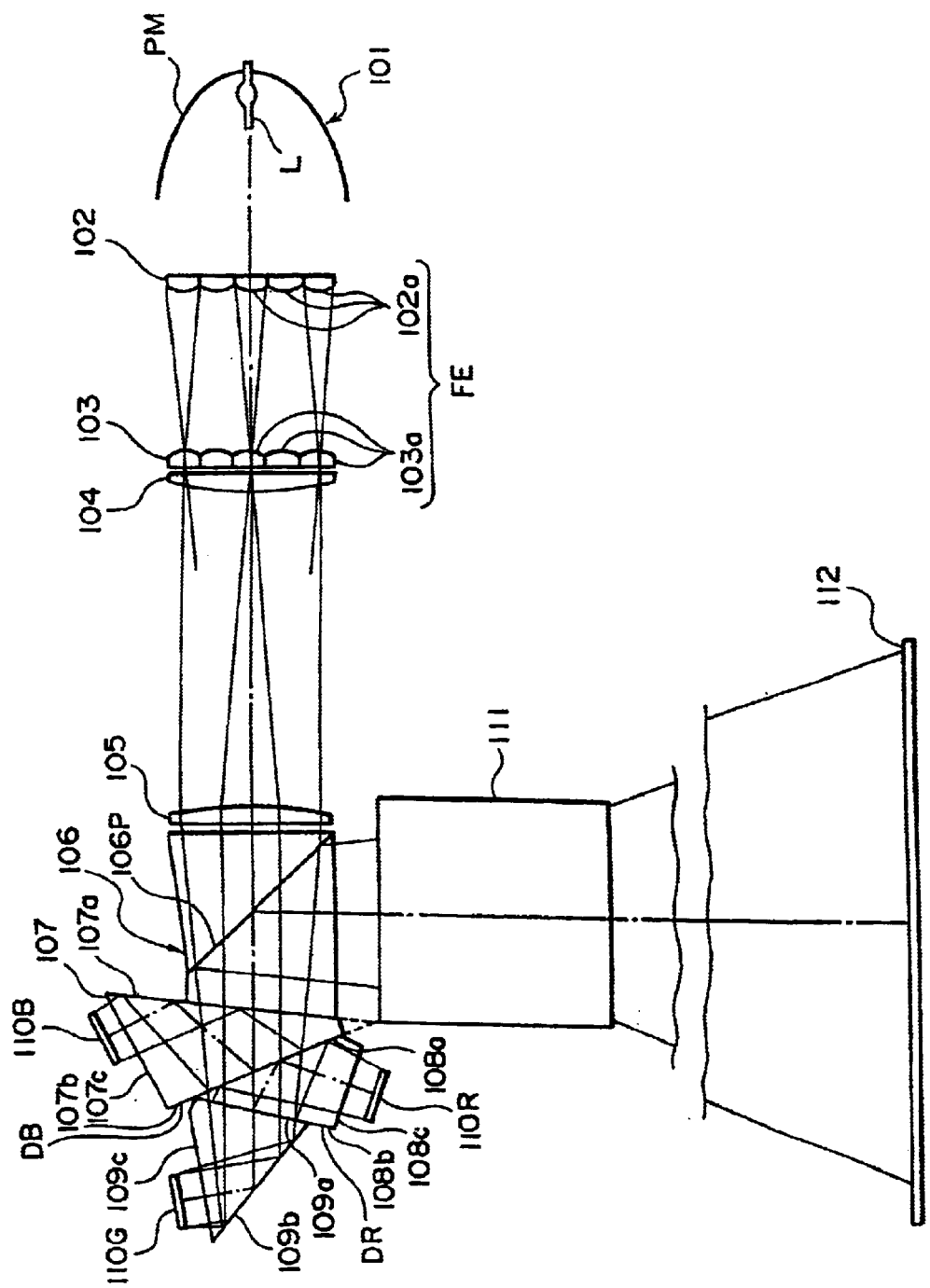
FIG. 1 is an explanatory view showing a basic construction of a projection type display device in a first embodiment of the present invention.

FIG. 1 is a view schematically showing a configuration of a projection type display device in a first embodiment of the present invention. A light source 101 constructed of a lamp L and a parabolic mirror PM having a concave surface, emits a substantially parallel beam as light source beam.

The light source beam from the light source 101 enters a fly's eye integrator FE. The fly's eye integrator FE is constructed of a first lens plate 102 having a plurality of first lens elements 102a, and a second lens plate 103 having a plurality of second lens elements 103a corresponding to the first lens elements 102a. Herein, the second element elements 103a are provided in focal positions of the first lens elements 102a. The light incident upon the first lens plate 102 is split into a plurality of beams defined by external lens shapes of the first lens elements 102a. The external shapes of the first lens elements 102a are analogous to shapes into which light receiving surface of light valves 110B, 110R, 110G defined as radiation receiving members are proportionally reduced. Each of light receiving surfaces of the light valves 110B, 110R, 110G takes a rectangular shape. Therefore, the first lens element 102a also takes a rectangular shape. Then, the beams entering the first element elements 102a of the first lens plate 102 converge on the second lens elements 103a of the second lens plate 103, thus forming luminous points.

With such a configuration, the fly's eye integrator FE splits the beam emitted from the light source 101. The thus split light beams are overlapped on the light receiving surfaces of the light valves 110B, 110R, 110G defined as the radiation receiving surfaces. A uniformity of illuminance of the illumination radiation can be thereby enhanced.

Next, the beams emitted from the fly's eye integrator FE travel through a condenser lens 104 and a field lens 105 and enter a polarization beam splitter 106.

The polarization beam splitter 106 has a polarized light splitting element 106P. The polarized light splitting element 106P separates the light source beam from the light source 101 into P-polarized beam penetrating the polarized light splitting element 106P and S-polarized beam reflected by this splitting element 106P. The penetrated P-polarized beam exit the polarization beam splitter 106 and enters a color separating/synthesizing prism constructed of prisms 107, 108, 109 and a plurality of dichroic films coated on predetermined surfaces of these prisms. The S-polarized beam reflected from the polarized light splitting element 106P, after a light path of the S-polarized beam has been deflected at 90 degrees, travel forward and are then discarded.

Given next is an explanation of a structure of the color separating/synthesizing prism that color-separates the light beam into an R-beam, a G-beam and a B-beam. As described above, the color separating/synthesizing prism is constructed of the three pieces of prisms 107, 108 and 109.

To start with, the prism 107 for extracting the B-beam component out of the light source beam, will be explained.

The prism 107 has a first surface 107a, a second surface 107b and a third surface 107c. The first surface 107a admits an incidence of the light source beam. The second surface 107b has a B-beam reflection dichroic film DB that reflects the B-beam but transmits the R- and G-beams. The third surface 107c lets the B-beam exit, which has been reflected from the second surface 107b and next totally reflected by the first surface 107a. With this structure, the prism 107 is capable of extracting the B-beam component in the beam emitted from the light source 101.

The B-beam having exited the third surface 107c enters the light valve 110B for the B-beam.

Next, the prism 108 for extracting the R-beam component out of the light source beam, will be explained.

The prism 108 is disposed with an air gap from the second surface 107b of the prism 107. The prism 108 has a first surface 108a, a second surface 108b and a third surface 108c. The first surface 108a admits an incidence of the beam penetrating the second surface 107b of the prism 107. The second surface 108b has an R-beam reflection dichroic film DR that reflects the R-beam but transmits the G-beam. The third surface 108c lets the R-beam exit, which has been reflected from the second surface 108b and next totally reflected by the first surface 108a. With this structure, the prism 108 is capable of extracting the R-beam component in the beam emitted from the light source 101.

The R-beam having exited the third surface 108c enters the light valve 110R for the R-beam.

Next, the prism 109 for extracting the G-beam component out of the light source beam, will be described.

The prism 109 is provided in a way that fixes its first surface 109a to the second surface 108b of the prism 108 by a bonding agent.

The prism 109 has a first surface 109a, a second surface 109b and a third surface 109c. The first surface 109a admits an incidence of the beam penetrating the second surface 108b of the prism 108. The second surface 109b totally reflects the G-beam. The third surface 109c lets the G-beam exit, which has been totally reflected from the second surface 109b. With this structure, the prism 109 is capable of extracting the G-beam component in the beam emitted from the light source 101.

The G-beam having exited the third surface 109c enters the light valve 110G for the G-beam.

Next, a structure of the reflection type light valve will briefly described. The reflection type light valve used in the first embodiment is classified as an electrically writable reflection light valve taking a rectangular shape. A size of an incidence surface of each light valve is the same as in the prior art described above and is therefore 0.907 in., and a surface dimension of the incidence surface is 18.43 mm (width)×13.82 mm (length). The light valves are disposed lengthwise in the first embodiment and a second embodiment but crosswise in third and fourth embodiment which will be discussed later on. The electrically writable reflection light valve is constructed of a non-linear element such as a TFT (Thin Film Transistor) provided per pixel on a silicon wafer substrate, a reflection mirror element connected to an output portion of this non-linear element, and a liquid crystal layer disposed between the mirror element and a transparent electrode. Then, with switching of the TFT selected by a color signal of each color beam, an array of liquid crystal molecules in the liquid crystal layer can be changed for every pixel. Herein, the liquid crystal layer functions as a wavelength plate with respect to the P-polarized beam incident on the position corresponding to the pixel selected. Therefore, a polarizing direction of the incident beam is changed into S-polarized beam, and thus the beam is reflected as a modulated beam and then exits. On the other hand, the P-polarized beam incident on the position corresponding to a non-selected portion is reflected as a non-modulated beam in a way that keeps the state of the P-polarized beam, and then exits.

The beams modulated by the light valves 110B, 110R, 110G for the respective color are again incident as the S-polarized beams upon the color seperating/synthesizing prism.

The color separating/synthesizing prism color-synthesizes the beams reflected from the light valves 110B, 110R, 110G.

The color-synthesized beam is analyzed by the polarized light splitting element 106P of the polarization beam splitter 106. Then, only the S-polarized beam component as the beam modulated by the light valve enters a projection lens 111. The projection lens 111 projects images of the R-, G- and B-color light valves as a full-color image on a screen 122. Note that the P-polarized beam component as the non-modulated beam travels straight through the polarized light splitting element 106P of the polarization beam splitter 106, then exits on the side of the light source 101 and is discarded.

Herein, the B-beam is easily absorbed by the optical member. Hence, the scheme is that the B-beam is color-synthesized finally.

To give a further explanation of the above prism 107, the prism 107 totally reflects the beam from the reflection type light valve 110B at its first surface 107a, and subsequently this reflected beam, after being reflected by the dichroic film DB, enters the first surface 107a back.

Next, glass materials of the polarization beam splitter 106 and of the prisms 107, 108, 109 configuring the color separating/synthesizing prism, will be explained. If the modulated beams modulated by the light valves 110B, 110R, 110G change in their polarizing states in the process of traveling through the polarization beam splitter 106 and the respective prisms 107, 108, 109, a contrast of the analyzed beams declines. It is therefore desirable that these glass materials do not change the polarizing states of the polarized beams traveling through the prisms. Hence, it is required that the glass material exhibiting a small absolute value of a photoelastic constant (which will hereinafter be called a "C-value") be used. In view of this requirement, the first embodiment involves the use of the glass material exhibiting the small absolute value of C-value having a composition shown in the following Table 1. This glass material has the absolute value of C-value, which is equal to or less than $5\times10^{-9}$ cm$^2$/N in a region where the wavelength ranges from 400 nm to 700 nm. This glass material is one of the glass materials exhibiting an excellent characteristic with the minimum C-value.

TABLE 1

| Composition | Percentage Content (WT %) |
| --- | --- |
| $SiO_2$ | 24.4 |
| $Na_2O$ | 0.9 |
| $K_2O$ | 0.9 |
| PbO | 73.5 |
| $As_2O_3$ | — |
| $Sb_2O_3$ | 0.3 |

Note that the first embodiment has the scheme in which the P-polarized beams, as shown in the discussion given above, enter the light valves, and the S-polarized beams are reflected as the modulated beams by the polarization beam splitter and then analyzed. Without being limited to this scheme, however, another scheme may also be taken, wherein the S-polarized beams enter the light valves, and the P-polarized beams penetrate as the modulated beams the polarization beam splitter and are then analyzed.

Figure 13:
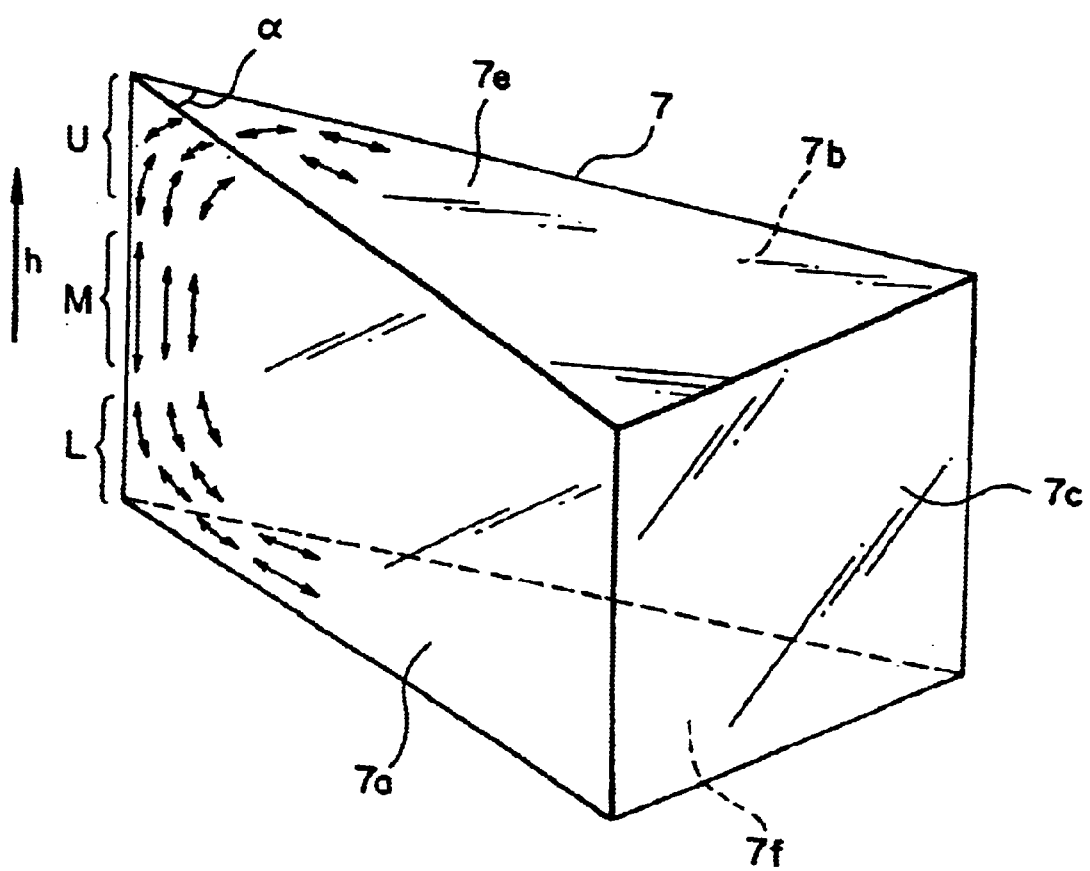
FIG. 13 is a view showing stresses occurred in the prism.

Next, the prism 107 will be described. As can be seen in FIG. 1, the prism 107 in the first embodiment assumes a shape with its acute-angled portion cut off. This configuration will be explained in greater detail with reference to FIGS. 13 and 12D. FIG. 13 shows a stress distribution of the prism 7 in the prior art. FIG. 12D shows a decline of contrast of a projected image.

As described above, the stress occurs in the prism in the prior art as shown in FIG. 13. Supposing herein that a birefringence occurs due to the internal stress in a central area of a front side end having an acute angle α, the decline of contrast of the projected image shown in FIG. 12D is to occur in the vicinity of a central area N2 of a right side end surface. The actual decline of contrast, however, occurs in an area N1 shown in FIG. 12D.

The inventor of the present application concentrates his attentions on such a point that the polarized beam (P-polarized beam) passing via the polarization beam splitter 6 travels through within the prism 7 in the projection type display device according to the prior art. Referring to FIG. 13, a direction of oscillations of the polarized beam (P-polarized beam) is substantially right-angled to the direction (parallel to the sheet surface) of the internal stress in the vicinity of the area M of the acute-angled α front side end of the prism 7. Therefore, almost no phase difference occurs in the polarized beam passing through the prism 7. As a result, the direction of oscillations of the transmitted beam remains as it is.

By contrast, a continuous internal stress into which the front side end stress and a stress occurred on an upper surface 7e or a lower surface 7f are synthesized, occurs in the vicinity of an upper side end area U or a lower side end area L of the prism 7. An absolute value of magnitude of this continuous internal stress is small. The continuous internal stress in the vicinity of the upper side end area U or the lower side end area L occurs in the direction substantially at 45 degrees to the direction of oscillations of the incident polarized beam. Hence, a phase difference is easy to occur in the polarized beam passing through the prism 7. As a result, there changes the direction of oscillations of the polarized beam traveling via the vicinity of the upper side end area U or the lower side end area L.

For the reason elucidated above, according to the first embodiment, the portion vicinal to the apex having the acute angle α is cut off. With this configuration, the polarized beam passing through the prism 107 can reduce the influence of the stress occurred in the upper side end area U or the lower side end area L of the acute-angled α front side end portion. It is therefore possible to keep the state of oscillation coupling of the polarized beam traveling through within the prism 107. This results in exhibiting such an effect that the projected image having a preferable contract can be obtained.

Figure 2:
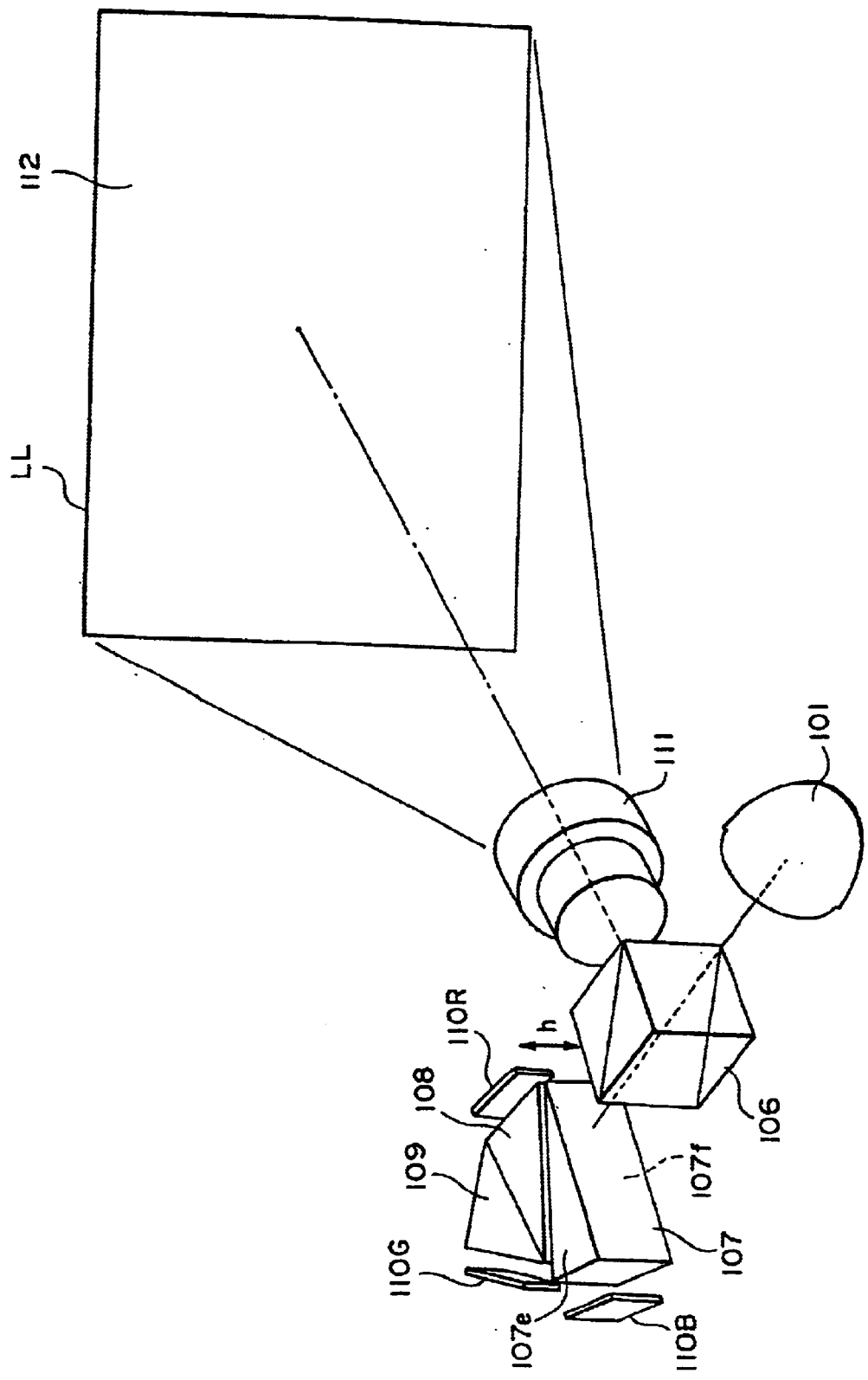
FIG. 2 is a view schematically showing a configuration of a modified example of the first embodiment.

FIG. 2 is a perspective view schematically showing a configuration of the projection type display device in a modified example of the first embodiment. Referring to FIG. 2, for simplifying the illustration, the fly's eye integrator FE, the field lens 104 and the condenser lens 105 are omitted. Further, the same components as those in the first embodiment are marked with the same numerals, and the repetitive explanations are omitted. As shown in FIG. 2, the configuration is that side surfaces 107e, 107f through which none of the beams from the prism 107 pass, are parallel to a long side LL of a rectangular display area for the projected image.

This modified example takes a configuration in which the prism 7 is extended in a direction of its height h. With this configuration taken, it is feasible to avoid the stress from affecting the transmitted beams, this stress occurring in the vicinity of the upper side end area U or the lower side end area L shown in FIG. 13.

FIG. 3A is a view showing a configuration in section perpendicular to an incidence surface 107a, on which the light source beam is incident, of the prism 107. FIG. 3B is a view as viewed from the side of the surface 107a. FIG. 3C is a view as viewed from the side of the surface 107c. The height h is 39 mm which is higher than the prism in the prior art, however, other sizes are the same as those in the prior art. Note that glass materials used herein are the same as those in the prior art.

FIG. 3B shows an effective illumination area 107d. Referring to FIG. 12B in the prior art, a width around the non-illumination area 7d is 2.7 mm. By contrast, according to this embodiment, the width is 6.2 mm. Further, according to the prior art, a ratio of a length of the effective illumination area 7d in the direction of the height h of the prism to the height of the prism, is 1:1.203. By contrast, according to this embodiment, this ratio is 1:1.466.

FIG. 3B also shows a contrast decline area N1 of the projected image on the surface 107a of the prism 107. As obvious from FIG. 3B, the contrast decline area N1 is not projected on the screen 112. As a result, it is possible to exhibit the effect in which the projected image having the preferable contrast can be obtained.

Figures 4A, 4B:
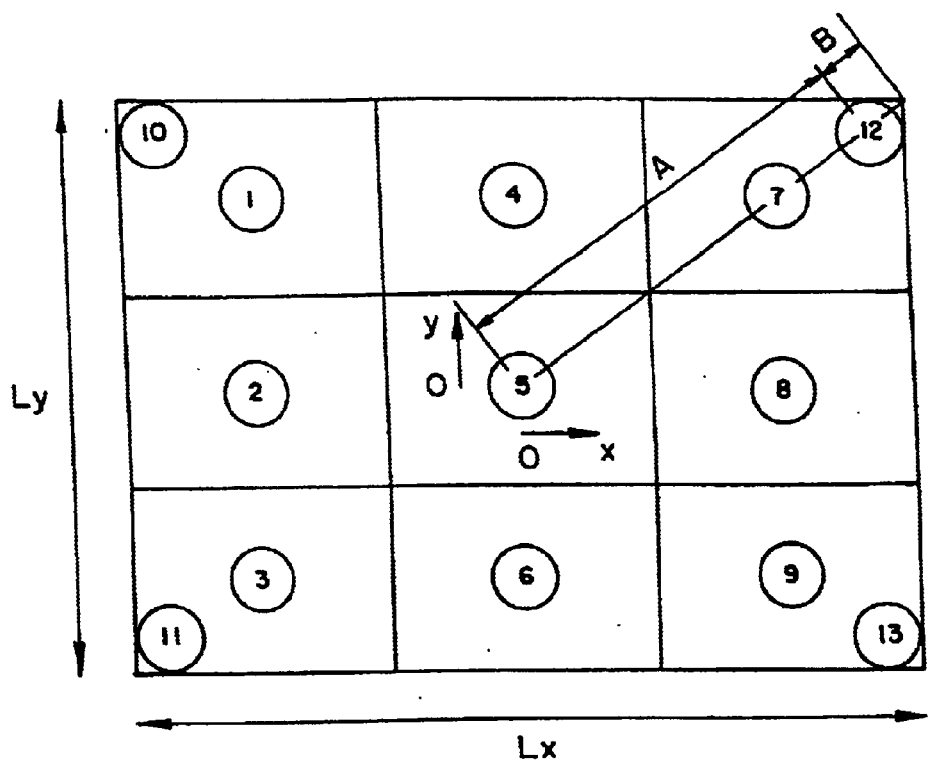
FIGS. 4A and 4B are diagrams showing measuring points.

Next, a procedure of measuring the contrast of the projected image in this embodiment will be explained. To begin with, as shown in FIG. 4A, the rectangular display area (image projection area) defined as a predetermined surface of the screen 112 is segmented into nine segments. Then, colors are measured when the image signal indicates black at totally 13 points including measuring points Nos. 1, 2, 3, 4, 5, 6, 7, 8, 9 at the centers of the respective segments and measuring points Nos. 10, 11, 12, 13 existing in the vicinity of the four apices of the rectangular display area but inside of these apices.

FIG. 4B shows position coordinates of the measuring points Nos. 1 through 13. The origin (0, 0) is set at the center (the position corresponding to the measuring point No. 5) of the rectangular display area. Herein, the measuring point No. 12 is a point at which to divide, at a ratio of A:B=9:1, a distance between the apex of the rectangular display area and the measuring point No. 5, corresponding to the center of each of the light valves 110B, 110R, 110G, in the rectangular display area of the screen 112.

Figure 5A:
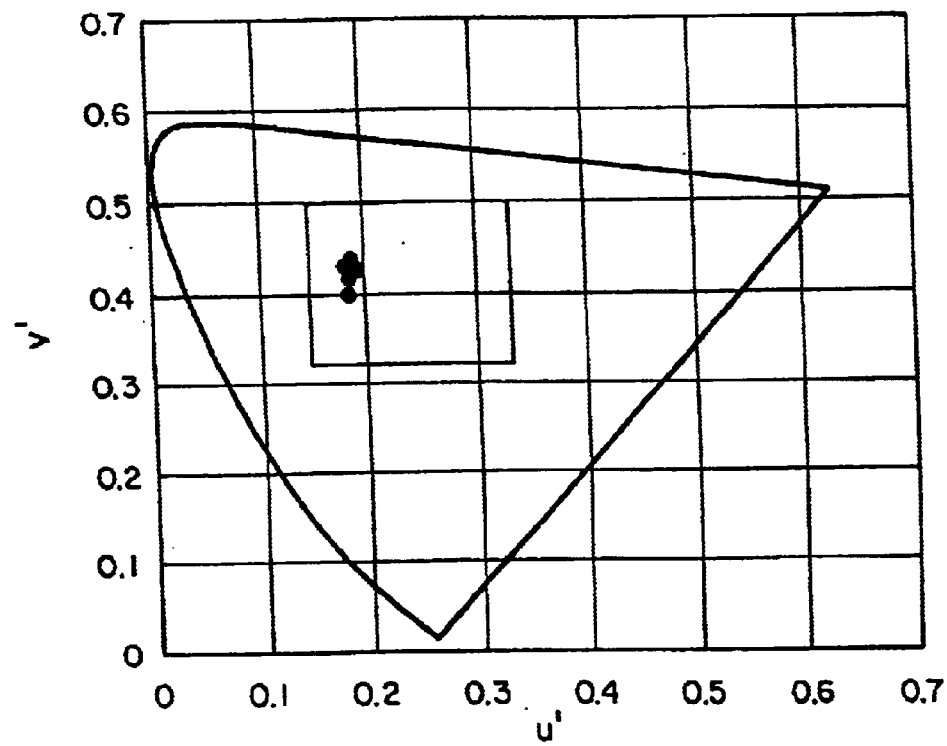
FIGS. 5A and 5B are graphs showing color coordinates of a projected image in a modified example of the first embodiment.
Figure 5B:
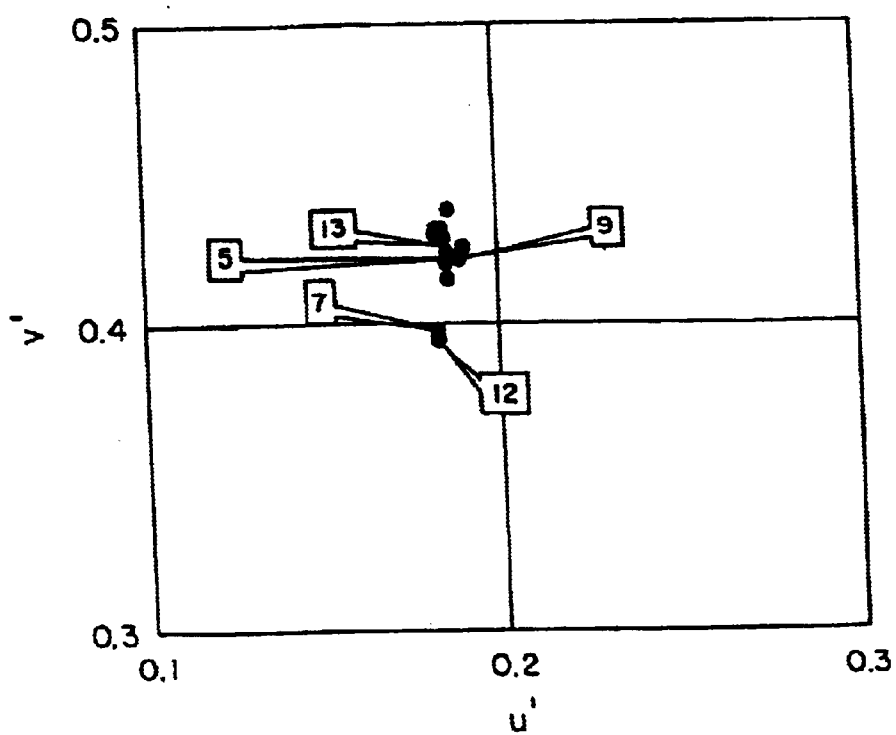

FIG. 5A is a graph representing, based on a u'v' coordinate system (CIE1976UCS chromaticity diagram), the colors of the positions of the measuring points Nos. 1 though 13 in the rectangular display area (the image projection area) of the screen 112 that is defined as the predetermined surface when the image signal indicates black in the embodiment shown in FIGS. 3A through 3C. Further, FIG. 5B is an enlarged diagram showing measured values in FIG. 5A. Moreover, the following Table 2 shows the measured values at the respective measuring points and distances from the measuring point 5.

TABLE 2

| Measuring Point Nos. | u' | v' | Distances from Measuring Point 5 |
|---|---|---|---|
| 1 | 0.183322 | 0.431082 | 0.00961 |
| 2 | 0.184486 | 0.426101 | 0.004497 |
| 3 | 0.182195 | 0.430124 | 0.008997 |
| 4 | 0.184922 | 0.419275 | 0.002429 |
| 5 | 0.18529 | 0.421676 | 0 |
| 6 | 0.184851 | 0.428423 | 0.006761 |
| 7 | 0.182635 | 0.397455 | 0.024366 |
| 8 | 0.185359 | 0.413812 | 0.007864 |
| 9 | 0.188411 | 0.420725 | 0.003263 |
| 10 | 0.18144 | 0.428497 | 0.007833 |
| 11 | 0.185904 | 0.43667 | 0.015007 |
| 12 | 0.182229 | 0.394767 | 0.027083 |
| 13 | 0.189905 | 0.424109 | 0.005217 |

According to this embodiment, when the image signal indicates black, the color synthesizing optical system 107 and the light valve 110B are positioned so that the color at the measuring point No 12 existing in the vicinity of the apex but inside the apex of the rectangular display area of the screen 112 that is defined as the predetermined surface, becomes such a coordinate value color that the distance from the u'v' space coordinate value of the color at the measuring point No. 5 corresponding to the center of the light valve 110B, is equal to a smaller than 0.027 at the maximum.

Further, according to this embodiment, when the image signal indicates black and even if at any one of the measuring points Nos. 1 through 13, the color synthesizing optical system 107 and the light valve 110B are positioned so that the color at that measuring point becomes such a coordinate value color that the distance from the u'v' space coordinate value of the color at the measuring point No. 5 corresponding to the center of the light valve 110B, is equal to a smaller than 0.09 and preferably 0.04. If the distance is 0.04 or less, the human eyes are hard to detect a ununiformity in chromaticity of black. As a result, there is exhibited an effect in which the projected image with a preferable contrast can be displayed.

Figure 6A:
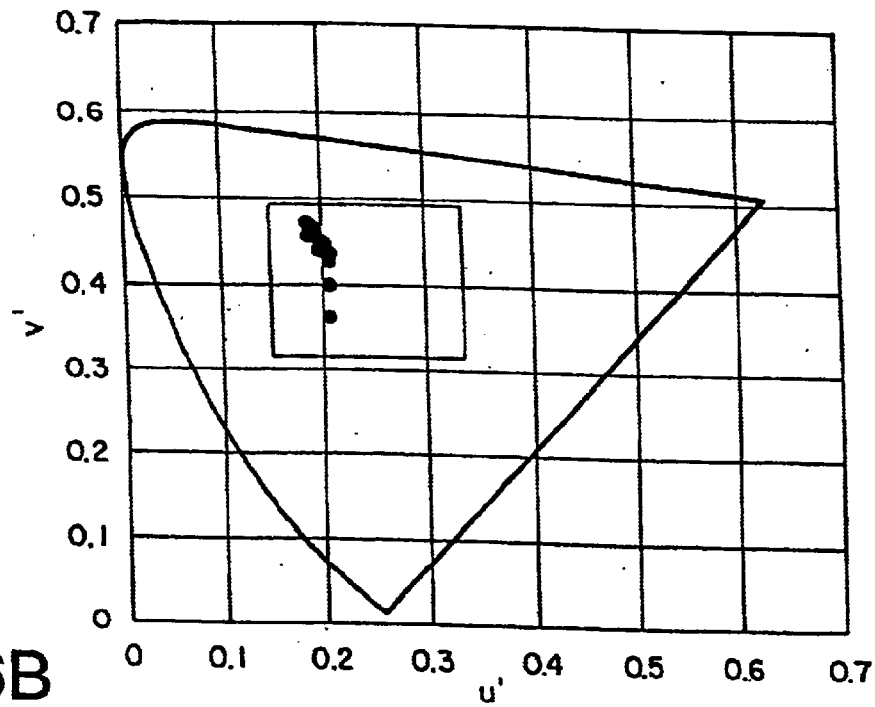
FIGS. 6A and 6B are graphs showing color coordinates of a projected image according to the prior art.
Figure 6B:
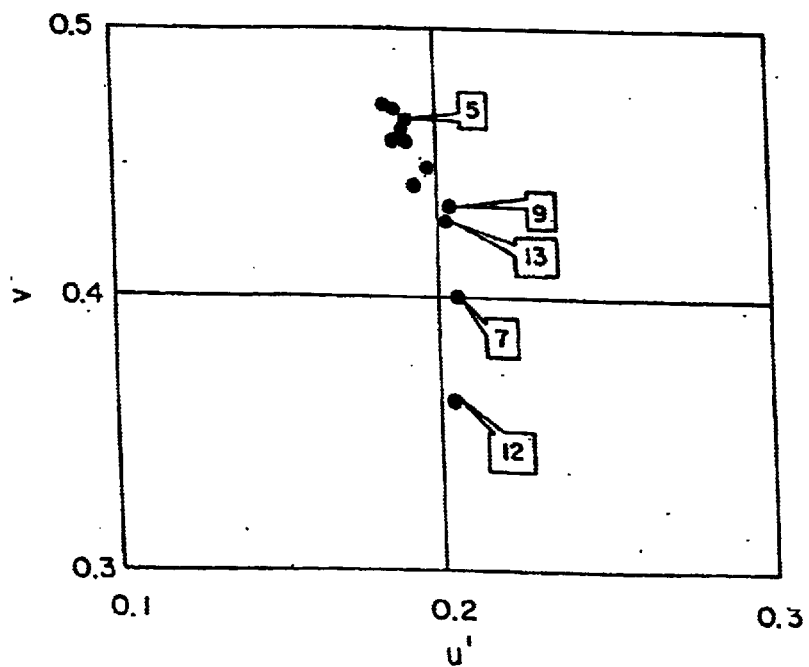
Figure 11:
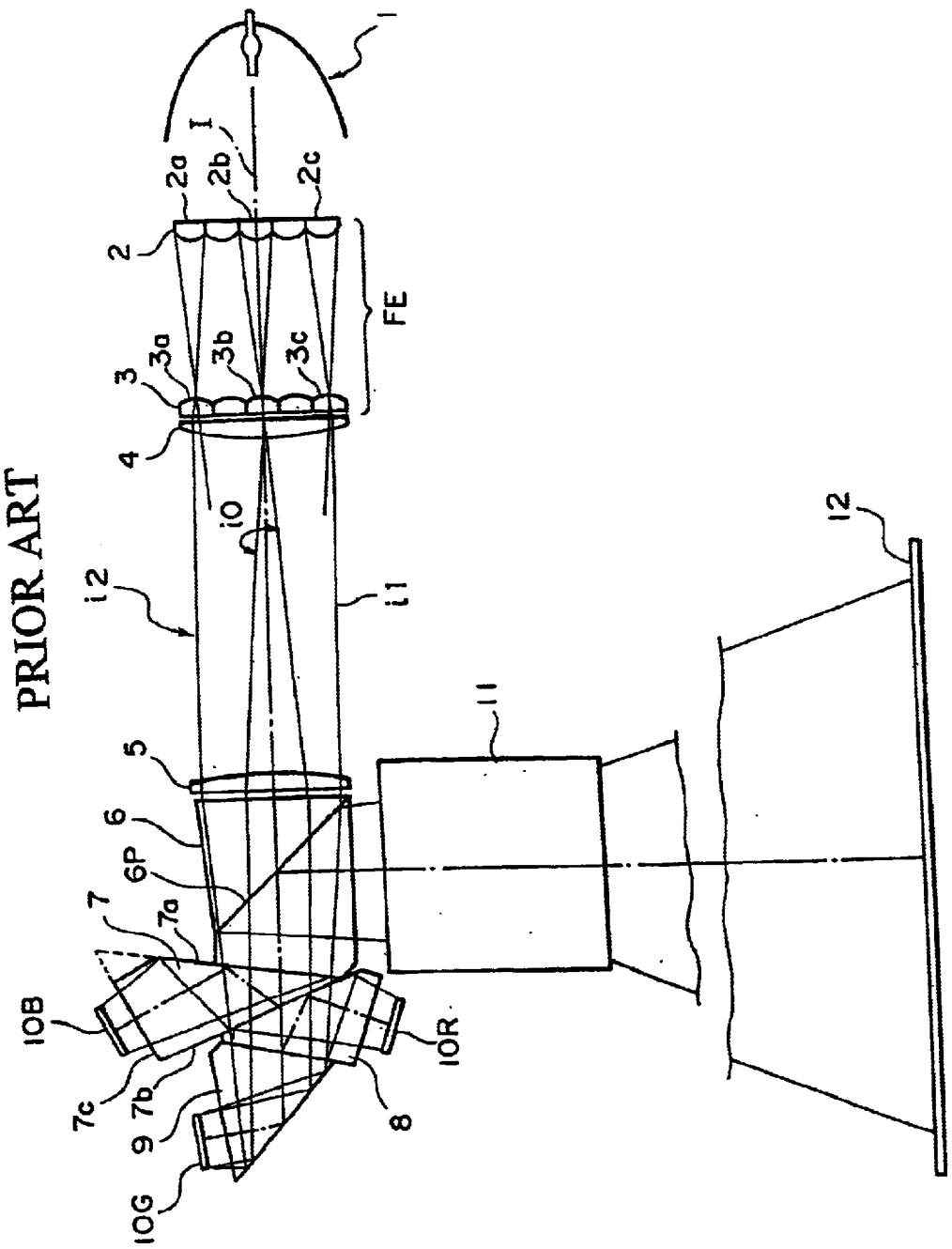
FIG. 11 is an explanatory view showing a basic configuration of a projection type display device in the prior art.

Further, for a comparison with this embodiment, FIGS. 6A and 6B show results of the same color measurements in the projection type display device using the prism 7 in the prior art illustrated in FIGS. 12A through 12C. Table 3 shows the measured values thereof and the distances from the measuring point 5.

TABLE 3

| Measuring Point Nos. | u' | v' | Distances from Measuring Point 5 |
| --- | --- | --- | --- |
| 1 | 0.189894 | 0.459125 | 0.005802 |
| 2 | 0.18797 | 0.468045 | 0.005215 |
| 3 | 0.190537 | 0.461797 | 0.003086 |
| 4 | 0.19368 | 0.440367 | 0.024282 |
| 5 | 0.191868 | 0.464581 | 0 |
| 6 | 0.191745 | 0.456289 | 0.008293 |
| 7 | 0.204545 | 0.400568 | 0.065256 |
| 8 | 0.197523 | 0.447439 | 0.018051 |
| 9 | 0.203568 | 0.432844 | 0.033825 |
| 10 | 0.187097 | 0.457258 | 0.00874 |
| 11 | 0.184864 | 0.470378 | 0.01728 |
| 12 | 0.203474 | 0.361042 | 0.104187 |
| 13 | 0.202343 | 0.426518 | 0.039478 |

According to the prior art (FIGS. 11, 12A, 12B and 12C), when the image signal indicates black, the color synthesizing optical system 7 and the light valve 10B are positioned so that the color at the measuring point No 12 existing in the vicinity of the apex but inside the apex of the rectangular display area of the screen 12 that is defined as the predetermined surface, becomes such a coordinate value color that the distance from the u'v' space coordinate value of the color at the measuring point No. 5 corresponding to the center of each of the light valves 10B, 10R, 10G is 0.104 at the maximum.

It is obvious that the distance 0.027 described above in this embodiment is more improved than the distance 0.104 in the prior art.

(Second Embodiment)

FIGS. 7A, 7B and 7C are views each showing the prism 107 of the projection type display device in a second embodiment. The basic configuration of the projection type display device is the same as that in the first embodiment, wherein the same components are marked with the same numerals, and the repetitive explanations are omitted.

FIG. 7A is the view showing a configuration in section perpendicular to the light source beam incidence surface 107a of the prism 107. FIG. 7B is the view viewed from the side of the surface 107a. FIG. 7C is the view viewed from the surface of the surface 107c. The configuration in the second embodiment is that the beams do not penetrate areas proximal to the portion having the most acute angle α. Therefore, a length of the surface 107a in the longitudinal direction is larger than that in the prism in the prior art shown in FIG. 12A. Hence, as apparent from FIG. 7B, positions of an incidence optical axis I and outermost marginal rays i1, i2 shift rightward from the center on the surface 107a. Herein, in the prism in the prior art shown in FIG. 12A, the portion of an internal angle of 54 degrees is cut off. By contrast, according to the second embodiment, the incidence beams shift rightward and therefore penetrate the portion of the internal angle of 54 m degrees. This portion is not therefore cut off, and the prism assuming the triangular shape is used as it is.

Further, with respect to the effective illumination area 107d on the incidence surface 107a of the prism 107, the non-illumination width is set to 3 mm in the prism according to the prior art shown in FIG. 12B and, by contrast, set to 14 mm in the second embodiment.

Note that other configurations and the height h of the prism 107 are substantially the same as those in the prism according to the prior art illustrated in FIGS. 12A through 12C.

FIG. 7B also shows the contrast decline area N1 of the projected image on the surface 107a of the prism 107. As obvious from FIG. 7B, the contrast decline area N1 is not projected on the screen 112. As a consequence, there is acquired the effect in which the projected image having the preferable contrast can be obtained.

(Third Embodiment)

FIG. 8 is a perspective view schematically showing a configuration of the projection type display device in a third embodiment. Referring to FIG. 8, for simplifying the illustration, the fly's eye integrator FE, the field lens 104 and the condenser lens 105 are omitted. Further, the same components as those in the first embodiment are marked with the same numerals, and the repetitive explanations are omitted. In the third embodiment, the direction in which the light valves 110R, 110G, 110B is different from that in the first embodiment. As illustrated in FIG. 8, the geometry is that the side surfaces 107e, 107f each receiving no transmission of the beams from the prism 107 are substantially orthogonal to a long side LL of the rectangular display area for the projected image. Hereinafter this geometry is called a (vertical layout). Note that as the vertical layout is adopted, the shapes of primarily the polarization beam splitter 106 and the light valves 110B, 110R, 110G and also the fly's eye integrator FE, are changed.

FIG. 9A is a view showing a configuration in section perpendicular to the light source beam incidence surface 107a of the prism 107. FIG. 9B is a view as viewed from the side of the surface 107a. FIG. 9C is a view as viewed from the side of the surface 107c. According to the third embodiment, the height h is of the surface 107a of the prism 107 is higher than in the prism according to the prior art. Then, the non-illumination width in the third embodiment is 7.35 mm from the upper side end.

FIG. 9B also shows the contrast decline area N1 of the projected image on the surface 107a of the prism 107. As obvious from FIG. 9B, the contrast decline area N1 is not projected on the screen 112. As a consequence, there is acquired the effect in which the projected image having the preferable contrast can be obtained.

(Fourth Embodiment)

The projection type display device in a fourth embodiment adopts the same vertical layout as that in the third embodiment. Further, the same components as those in the first embodiment are marked with the same numerals, and the repetitive explanations are omitted.

FIG. 10A is a view showing a configuration in section perpendicular to the light source beam incidence surface 107a of the prism 107. FIG. 10B is a view as viewed from the side of the surface 107a. FIG. 10C is a view as viewed from the side of the surface 107c. According to the fourth embodiment, the length of the surface 107a of the prism 107 in the longitudinal direction is larger than in the prism according to the prior art shown in FIGS. 12A through 12C. In the fourth embodiment, the non-illumination width is 14 mm from the left side end.

FIG. 10B also shows the contrast decline area N1 of the projected image on the surface 107a of the prism 107. As obvious from FIG. 10B, the contrast decline area N1 is not projected on the screen 112. As a consequence, there is acquired the effect in which the projected image having the preferable contrast can be obtained.

As discussed above, according to the present invention, it is feasible to provide the projection type display device capable of obtaining the projected image exhibiting no ununiformity but the preferable contrast with the simple configuration.

What is claimed is:

1. A projection type display device comprising:
   an illumination optical system for supplying an illumination radiation;
   a polarization splitting/color separating optical system for polarization-splitting and color-separating beam from said illumination optical system;
   reflection type light valves, each taking a rectangular shape, for modulating the beam from said polarization splitting/color separating optical system in accordance with an image signal and letting the modulated beams exit;
   a color synthesizing optical system for color-synthesizing the beams from said reflection type light valves;
   a light analyzing optical system for analyzing the beam from said color synthesizing optical system; and
   a projection optical system for projecting on a predetermined surface an image based on the image signal generated in said reflection type light valves,
      wherein when the image signal indicates black, said color synthesizing optical system and each of said light valve are positioned so that coordinates in CIE1976UCS chromaticity diagram that show a color of a predetermined point in the vicinity of an apex but inside of the apex of a rectangular display area on the predetermined surface, fall within a distance equal to or less than 0.09 from coordinates in the chromaticity diagram that show a color at the center of said light valve.

2. A projection type display device according to claim 1, wherein when the image signal indicates black, a color separating/synthesizing optical system and each of said light valves are positioned so that coordinates in CIE1976UCS chromaticity diagram that show a color of a predetermined point in the vicinity of an apex but inside of the apex of a rectangular display area on the predetermined surface, fall within a distance equal to or less than 0.04 from coordinates in the chromaticity diagram that show a color at the center of said light valve.

3. A projection type display device according to claim 1 or 2, wherein said reflection type light valves include a reflection type light valve for a blue beam and a reflection type light valve for a long wavelength region, upon which the beam in the longer wavelength region than the blue beam is incident,
   said color synthesizing system includes a first prism and a second prism,
   said first prism receives an incidence of the beam from said light valve for the long wavelength region and lets the beam exit, and
   said second prism receives an incidence of the beam from said light valve for the blue beam, then receives an incidence of the beam exiting said first prism, synthesizes the blue beam entering said second prism with the beam in the long wavelength region and lets the synthesized beam exit toward said light detection optical system.

4. A projection type display device according to claim 1 or 2, wherein said color synthesizing optical system includes a prism,
   said prism has a first surface totally reflecting the beam from said reflection type light valve, and a second surface formed with a dichroic film reflecting the totally reflected beam, and said first surface lets the beam originally coming from said reflection type light valve, which beam is totally reflected by said first surface and reflected by said dichroic film, exit.

5. A projection type display device according to claim 1 or 2, wherein said prism of said synthesizing optical system has an apex angle of 45 degrees or smaller.

6. A projection type display device according to claim 1 or 2, wherein when the image signal indicates black, said prism of said color synthesizing optical system and each light valve are positioned so that coordinates in CIE1976UCS chromaticity diagram that show a color of any one of points in the rectangular display area on the predetermined surface, fall within a distance equal to or less than 0.09 from coordinates in the chromaticity diagram that show a color at the center of said light valve.

7. A projection type display device according to claim 1 or 2, wherein when the image signal indicates black, said prism of said color synthesizing optical system and each light valve are positioned so that coordinates in CIE1976UCS chromaticity diagram that show a color of any one of points in the rectangular display area on the predetermined surface, fall within a distance equal to or less than 0.04 from coordinates in the chromaticity diagram that show a color at the center of said light valve.

8. A projection type display device according to claim 1 or 2, wherein the predetermined point is a point at which to divide, at a ratio of 9 to 1, a distance between the position corresponding to the center of said light valve in the rectangular display area on the predetermined surface and the apex of the rectangular display area.

9. A projection type display device comprising:
   an illumination optical system for supplying an illumination radiation;
   a polarization splitting/color separating optical system for polarization-splitting and color-separating beam from said illumination optical system;
   reflection type light valves for modulating the beams from said polarization splitting/color separating optical system in accordance with an image signal and letting the modulated beams exit;
   a color synthesizing optical system for color-synthesizing the beams from said reflection type light valves;

a light analyzing optical system for analyzing the beam from said color synthesizing optical system; and a projection optical system for projecting on a predetermined surface an image based on the image signal generated in each of said reflection type light valves, wherein when the image signal indicates black, said color synthesizing optical system and each of said light valve are positioned so that coordinates in CIE1976UCS chromaticity diagram that show a color of a predetermined point in the vicinity of the farthest point but inside the farthest point from the center of the predetermined surface, fall within a distance equal to or less than 0.09 from coordinates in the chromaticity diagram that show a color at the center of said light valve.

* * * * *